(12) United States Patent
Fehn

(10) Patent No.: US 7,842,771 B2
(45) Date of Patent: Nov. 30, 2010

(54) SELF-ADHESIVE ADDITION-CROSSLINKING SILICONE COMPOSITIONS

(75) Inventor: Armin Fehn, Mehring (DE)

(73) Assignee: Wacker Chemie AG, Munich (DE)

( * ) Notice: Subject to any disclaimer, the term of this patent is extended or adjusted under 35 U.S.C. 154(b) by 722 days.

(21) Appl. No.: 11/745,503

(22) Filed: May 8, 2007

(65) Prior Publication Data

US 2007/0264510 A1    Nov. 15, 2007

(30) Foreign Application Priority Data

May 11, 2006    (DE) .................. 10 2006 022 097

(51) Int. Cl.
 *C08G 77/08* (2006.01)
(52) U.S. Cl. .......................... 528/15; 528/31
(58) Field of Classification Search .............. 528/15, 528/31
 See application file for complete search history.

(56) References Cited

U.S. PATENT DOCUMENTS

| 5,438,094 | A | * | 8/1995 | Fujiki et al. ............. 524/730 |
| 5,536,803 | A | * | 7/1996 | Fujiki et al. ............. 528/15 |
| 6,743,515 | B1 | | 6/2004 | Muller et al. |
| 7,521,813 | B2 | * | 4/2009 | Kashiwagi et al. ......... 257/791 |
| 2001/0011117 | A1 | | 8/2001 | Pesch et al. |
| 2001/0049414 | A1 | | 12/2001 | Muller et al. |
| 2002/0187358 | A1 | | 12/2002 | Reitmeier et al. |
| 2003/0236380 | A1 | | 12/2003 | Fehn et al. |
| 2005/0042462 | A1 | | 2/2005 | Fehn et al. |
| 2005/0089696 | A1 | | 4/2005 | Bosshammer et al. |

FOREIGN PATENT DOCUMENTS

| DE | 19959412 A1 | 6/2001 |
| DE | 10204893 A1 | 8/2003 |
| EP | 0686671 A2 | 12/1995 |
| EP | 0875536 A2 | 11/1998 |
| EP | 0728825 B1 | 4/2000 |
| EP | 1148098 A1 | 10/2001 |
| EP | 1266948 A2 | 12/2002 |
| EP | 1106662 B1 | 1/2004 |
| EP | 1375622 A1 | 1/2004 |
| EP | 1510553 A1 | 3/2005 |

* cited by examiner

*Primary Examiner*—Margaret G Moore
(74) *Attorney, Agent, or Firm*—Brooks Kushman P.C.

(57) ABSTRACT

Self-adhesive addition-crosslinking silicone compositions contain
(A) at least one diorganopolysiloxane,
(B) at least one SiH-containing crosslinker containing a defined fraction of radicals, with the proviso that the viscosity of the organohydropolysiloxane (B) as determined at 25° C. is 5 mPa·s to 5 Pa·s,
(C) at least one organohydrooligosiloxane, and
(D) at least one hydrosilylation catalyst.

8 Claims, No Drawings

SELF-ADHESIVE ADDITION-CROSSLINKING SILICONE COMPOSITIONS

BACKGROUND OF THE INVENTION

1. Field of the Invention

The invention relates to self-adhesive, addition-crosslinking silicone compositions, a process for producing addition-crosslinked silicone elastomers, and composite materials.

2. Background Art

It is known that the adhesion of addition-crosslinked silicone elastomers to numerous substrates, such as plastics, metals, and glasses, is low, and frequently even spontaneous detachment of the silicone elastomer from the substrate is observed. Since numerous applications attach critical importance to a firm and lasting substrate adhesion of the silicone elastomer, however, a multiplicity of specific measures have been proposed for achieving such a firm bond between substrate and silicone elastomer.

In principle, the adhesion of the silicone elastomer/substrate assembly can be increased by appropriately modifying the chemical and/or physical nature of the substrate and/or of the substrate surface, prior to the application of the addition-crosslinking silicone elastomer composition. This can be done, for example, by pretreating the substrate surface with adhesion-promoting additives (known as primers), by plasma treatment of the substrate surface, by mixing specific additives into the substrate material, by specifically adjusting the morphology of the substrate, and by increasing the surface roughness. A disadvantage to all of these measures is that additional process steps become necessary or specific requirements must be imposed on the nature of the substrate.

Furthermore, the adhesion of addition-crosslinking silicone elastomers to various substrates can be improved by means of one or more additives which are incorporated into the uncrosslinked silicone compound. Such additives include compounds containing highly reactive functional groups such as alkoxy, epoxy, carboxyl, and amino groups, for example, these groups generally being selected such that the adhesion promoter has the capacity to react both with the substrate and with a silicone elastomer constituent. Although it is possible in some cases, by means of such adhesion promoters, to forego the pretreatment of the substrate, the adhesion achieved nevertheless frequently fails to meet the requirements imposed. Additionally, increasing the adhesion by means of higher levels of these adhesion promoters is possible only to a limited extent, since the highly reactive groups they contain then increasing adversely impact on properties such as storage stability, crosslinking characteristics (inhibition), and toxicological acceptability, for example.

Efforts have therefore been made to minimize the amount of adhesion promoters. For example, European published application EP 0 875 536 A2 describes a self-adhesive addition-crosslinking silicone rubber blend wherein the SiH crosslinker (a) characteristically contains at least 20 SiH groups, the remaining radicals being aliphatically saturated hydrocarbon radicals, an epoxy-functional alkoxysilane and/or alkoxysiloxane d) is present, and optionally, a peroxide g) is present. Particular preference is given in that context to the use of glycidyloxypropyltrimethoxysilane (Glymo). The silicone rubber blend described in patent EP 0 875 536 A2 is particularly suitable for the production of composite moldings which are composed of a silicone elastomer and an organic polymer. The composition described therein, however, has the disadvantage that adequate adhesion is obtainable only when using very SiH-rich crosslinkers, having on average at least 20 SiH groups per molecule. Indeed, in the examples therein, crosslinkers having 30 SiH groups per molecule are used. The use of crosslinkers of such high functionality considerably lessens the storage stability of addition-crosslinking silicone rubber mixtures: that is, the fluidity is massively impaired, proceeding as far as the stiffening of the compound, as a result of which the proper processing of the compound, for example by injection molding, is no longer possible. Furthermore, in order to obtain a high level of adhesion, it is necessary to use relatively large amounts of epoxy-functional alkoxysilanes or siloxanes, thereby considerably reducing the crosslinking rate. Although this reduction can be partly compensated through use of a peroxide, as described in EP 0 875 536 A2, it is nevertheless the case that the only peroxides suitable for this purpose, due to the low crosslinking temperatures required (softening of the organic polymer), are peroxides having a low initiation temperature, such as the 2,4-dichlorobenzoyl peroxide previously mentioned, and peroxides of this kind on the one hand are very objectionable toxicologically, owing to the cleavage products and secondary products that are liberated (PCB problem), and, on the other hand, further impair the storage stability of the compound. The disadvantages resulting from the use of epoxy-functional alkoxysilanes and siloxanes are the elimination of alcohol group(s), the use of reactive and polar groups, and, in the case of the functional alkoxysilanes, the problems of effluorescence and exudation. The elimination of the alcohol may, on one hand, be detrimental to effective adhesion since the alcohol accumulates at the surface of the silicone and hence at the face toward the substrate, thereby impairing contact between silicone and surface, and on the other hand, preference is given to using methoxysilanes, which release methanol, which is classed as toxic. Moreover, the liberation of volatile cleavage products (alcohol elimination) is accompanied by a not inconsiderable contraction of the silicone elastomer, which in general is undesirable.

The use of the reactive epoxide and/or alkoxy groups results, on account of their polarity, in a thixotropic silicone rubber composition, which may no longer be fluid, and, secondly, the reactive groups may react during storage, so as to no longer be available for the development of adhesion. If functional alkoxysilanes are used, then the silane molecules that have not been consumed by reaction in the course of crosslinking gradually migrate to the surface of the silicone elastomer, where they undergo hydrolysis and condensation to form silsesquioxanes, this formation being manifested as effluorescence on the surface and leading to a clouding of the elastomer. Moreover, because they migrate to the surface, they cause mold deposits in the course of injection molding, which gives rise to increased cleaning effort and longer idle times of the injection molding unit.

German patent application DE 102 04 893 A1 describes self-adhesive addition-crosslinking silicone mixtures which characteristically comprise at least one organohydrosiloxane crosslinker b) which is required to meet the conditions: i) one of the organohydrosiloxanes contains more than 7 mmol SiH/g; ii) one of the organohydrosiloxanes contains at least one aromatic group in the molecule; and iii), i) and ii) can be contained in the same organohydrosiloxane or in different organohydrosiloxanes. In spite of this specific crosslinker b), effective adhesion still requires at least one alkoxysilane and/or alkoxysiloxane containing in each case at least one epoxy group as well. Here too, therefore, there are the same problems as already described with the alkoxy/epoxy adhesion promoters.

European published application EP 0 686 671 A2 describes a self-adhesive addition-crosslinking material which uses no specific adhesion promoters, since the adhesion-promoting constituent either is an organohydropolysiloxane which possesses on average per molecule at least two SiH groups, at least 12 mol % of whose monovalent Si-bonded radicals are hydrocarbon radicals having an aromatic ring (it is expressly indicated that satisfactory adhesion is not achieved if the amount of the organic radical that carries aromatic ring is below 12 mol %), or is a compound that possesses on average, per molecule, at least one SiH group and contains a group consisting of two aromatic rings, the two aromatic rings being separated from one another by $R^{13}R^{14}Si$, $R^{13}R^{14}SiO-$, $-OR^{13}R^{14}SiO-$ or $-R^{13}R^{14}SiOR^{13}R^{14}Si-$, where the radicals $R^{13}$ and $R^{14}$ represent monovalent hydrocarbon radicals. The adhesion-promoting constituent, therefore, can be the same as the crosslinker of the silicone elastomer compound. This composition produces effective adhesion to organic polymers, particularly acrylonitrile-butadiene-styrene (ABS) copolymer, but at the same time exhibits great ease of demolding from metals. The high level of radicals containing aromatic rings in the SiH-containing, adhesion-promoting constituent, of more than 12 mol %, however, means that there is a considerable degree of incompatibility with the other constituents of the addition-crosslinking silicone elastomer compound. This leads on the one hand to partial separation (exudation) during storage, which necessitates repeated homogenization of the component containing this constituent prior to use. This incompatibility, which is already apparent from a milky cloudiness on the part of the uncrosslinked compound, is also manifested in a significantly reduced transparency on the part of the silicone elastomer parts produced from it. If the adhesion-promoting constituent functions also as the crosslinker for the silicone elastomer composition, the incompatibility leads to vulcanization defects, which leads in turn to inhomogeneous network formation and inadequate mechanical properties on the part of the vulcanizate. In order to avoid these vulcanization defects, it is necessary, in addition to the adhesion-promoting SiH-containing constituent, to use an SiH-containing crosslinker which is fully compatible with the silicone elastomer compound, although this results in other disadvantages, such as increased compression set values and increased exudation propensity of the adhesion-promoting constituent. The high level of radicals containing aromatic rings in the SiH-containing, adhesion-promoting constituent, of more than 12 mol %, also gives rise to a considerable structural viscosity and thixotropy in the silicone elastomer compound, which is undesirable in numerous applications, an example being the injection molding of liquid silicone rubber.

European patent EP 0 728 825 B1 describes self-adhesive silicone rubbers which comprise, as crosslinkers, $R_3Si(OSi(R)H)_nOSiR_3$, $(OSi(R)H)_n$— or $R_{4-1}Si(OSi(R)_2H)_1$, where n is at least 3 and l=3 or 4, and a specific adhesion promoter. This adhesion promoter is a molecule which contains at least one aliphatically unsaturated group and at least two phenylene groups.

European patent EP 1 106 662 B1 describes self-adhesive addition-crosslinking materials which allow effective adhesion as a result of a synergistic effect obtained from the combination of a specific Si—H crosslinker (B) and an organosilicon compound (C) with epoxide groups and hydrolyzable groups. Although that patent does offer a solution in terms of the crosslinker, it still exhibits disadvantages in respect of the adhesion-promoting additive (C).

In summary it can be stated that none of the conventional addition-crosslinking silicone elastomer compositions do justice to the requirements that are imposed on a self-adhesive silicone elastomer material that is to be used particularly for the production of composite moldings or for the encapsulation of electrical/electronic parts, said requirements including:

a) high fluidity (very little thixotropy, if any) and high storage stability,
b) high crosslinking rate at relatively low temperatures,
c) high adhesion to organic polymers and metals,
d) high adhesion even after storage of the uncrosslinked components and subsequent processing,
e) high adhesion of the composite even after its storage,
f) toxicological acceptability and suitability for use in the food or near-food sector,
g) high level of service properties (transparency, noncorrosiveness, profile of mechanical properties),
h) minimal, if any, deposits in the injection mold, and
i) minimal contraction of elastomer parts on injection molding.

SUMMARY OF THE INVENTION

An object of the invention was therefore to provide an addition-crosslinking silicone elastomer material which is readily self-adhesive to organic plastics and metals, which does not have some or all of the above disadvantages, and does justice to the aforementioned profile of requirements. These requirements have been met, surprisingly, with the compositions of the invention, whose effective self-adhesive quality is achieved through the combination of SiH-containing crosslinkers with SiH-containing oligosiloxanes.

DETAILED DESCRIPTION OF THE PREFERRED EMBODIMENT(S)

The invention provides self-adhesive addition-crosslinking silicone compositions comprising
(A) at least one diorganopolysiloxane of the general formula (1)

$$R^1_a R^2_b SiO_{(4-a-b)/2} \tag{1}$$

in which
$R^1$ is hydroxyl radical or a monovalent, optionally halogen-substituted hydrocarbon radical optionally containing O, N, S or P atoms, having 1 to 20 carbon atoms, and being free from aliphatically unsaturated groups,
$R^2$ is a monovalent, aliphatically unsaturated, optionally halogen-substituted hydrocarbon radical optionally containing O, N, S or P atoms and having 2 to 10 carbon atoms,
b denotes values from 0.0003 to 2, with the provisos that $1.5<(a+b)\leq 3.0$, that per molecule there are on average at least two aliphatically unsaturated radicals $R^2$, and that the viscosity of the diorganopolysiloxanes (A) as determined at 25° C. is 1 mPa·s to 40,000 Pa·s,
(B) at least one organohydropolysiloxane of the general formula (2)

$$R^3_c R^4_d R^5_e H_f SiO_{(4-c-d-2e-f)/2} \tag{2}$$

where
$R^3$ is a monovalent aliphatically saturated hydrocarbon radical having 1 to 10 carbon atoms,
$R^4$ (a) is an optionally halogen-substituted monovalent hydrocarbon radical having 6 to 20 carbon atoms which contains at least one aromatic $C_6$ ring, and/or
(b) is a halogen-substituted, saturated monovalent hydrocarbon radical optionally containing O or N atoms and having 2 to 20 carbon atoms, $R^5$ is an optionally halogen-substituted hydrocarbon radical optionally containing O, N, S or P atoms and having 6 to 24 carbon atoms which is divalent and is Si-bonded at both ends, c and f are positive numbers, and d and e are zero or a positive number, with the provisos that d and e cannot simultaneously be zero and that the viscosity of the organohydropolysiloxane (B) as determined at 25° C. is 5 mPa·s to 5 Pa·s, (C) at least one organohydrooligosiloxane of the general formula (3), (4), (5), (6) or (7)

$$(R^6HSiO)_n \qquad (3),$$

$$(R^6{}_3Si\text{—}O\text{—}(R^6HSiO)_m\text{—}SiR^6{}_3 \qquad (4),$$

$$(HR^6{}_2Si\text{—}O\text{—}(R^6HSiO)_m\text{—}SiHR^6{}_2 \qquad (5),$$

$$(R^6{}_3Si\text{—}O\text{—}(R^6{}_2SiO)_p(R^6HSiO)_o\text{—}SiR^6{}_3 \qquad (6),$$

$$(HR^6{}_2Si\text{—}O\text{—}(R^6{}_2SiO)_p(R^6HSiO)_o\text{—}SiHR^6{}_2 \qquad (7)$$

where $R^6$ is a monovalent, optionally halogen-substituted hydrocarbon radical having 1 to 10 carbon atoms, n is 4, 5, 6, 7, or 8, m is 4, 5, or 6, o is 3, 4 or 5, and p is 3, 4 or 5, with the proviso that o≧p, and (D) at least one hydrosilylation catalyst.

Organohydropolysiloxane (B) and organohydrooligosiloxane (C) function as crosslinkers and at the same time, completely surprisingly, synergistically act as adhesion promoters.

The advantageous properties of the silicone compositions lie in the fact that the self-adhesion is achieved by means of a constituent that is present in addition-crosslinking materials in any case, namely the SiH-containing crosslinker (B), in combination with the compound (C), the SiH crosslinker (B) needing to contain only a few groups which lower the compatibility with the remaining constituents of the material (primarily with the diorganopolysiloxane). These groups, moreover, are not reactive functional groups, and so the toxicological acceptability of the material (e.g., drinking water approval; BfR/FDA approval) is preserved, there are no vulcanization defects, storage stability is adequate, the transparency of the crosslinked silicone elastomer is preserved, and no outgassing, exuding or extractable constituents are added. The combination of the reduced-compatibility SiH crosslinker (B) with organohydrooligosiloxane (C) makes it possible to keep down the level of incompatible groups in the SiH crosslinker. Only the combination of both constituents, (B) and (C), leads to the synergy of the self-adhesion effects of these two constituents.

The present composition is notable in particular for the fact that a) the crosslinking rate is not reduced, and in some cases is in fact increased, b) there is no need to accept disadvantageous alterations in the mechanical elastomer properties, c) the adhesion-promoting constituents (B) and (C) function as crosslinkers at the same time (no additional SiH crosslinker needed), d) strong self-adhesion is obtainable even on metals, without preventing demoldability from metal vulcanizing molds (it is found that the adhesion to metal allows demolding of the silicone elastomer part shortly after crosslinking; however, if the adhered silicone elastomer/metal assembly is stored, the silicone elastomer within a short time unites firmly and durably with the metal surface), e) the fluidity of the uncrosslinked material is adversely affected hardly at all, f) the transparency is not lowered by additional adhesion promoters, g) there are no possibly toxic cleaved products released, h) there are no volatile constituents to have an adverse effect on contraction, i) the elastomers obtained are suitable for food-contacting and medical applications.

Although the adhesion-promoting constituent (B) of the present invention does exhibit reduced compatibility with the other constituents of the material, as is apparent from clouding in the course of incorporation by mixing, this clouding nevertheless disappears completely as soon as the material is heated for the purpose of crosslinking; this indicates homogeneous distribution of the crosslinker molecules in the material at the time of crosslinking.

If the adhesion-promoting, SiH-containing constituent (B) contains phenyl groups in at least 12 mol % of the radicals, in contrast, this clouding is maintained even at typical crosslinking temperatures, and indicates inhomogeneous network formation, which can also be demonstrated from the optical properties, the crosslinking characteristics, and the mechanical properties.

Components (A), (B) and (C) may comprise one compound or a mixture of different compounds.

Examples of the radicals $R^1$ are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl, and octadecyl radicals; cycloalkyl radicals such as the cyclopentyl, cyclohexyl, cycloheptyl, norbornyl, adamantylethyl and bornyl radicals; aryl or alkaryl radicals such as the phenyl, ethylphenyl, tolyl, xylyl, mesityl and naphthyl radicals; aralkyl radicals such as the benzyl, 2-phenylpropyl and phenylethyl radicals, and also derivatives of the above radicals that are halogenated and/or functionalized with organic groups, such as the 3,3,3-trifluoropropyl, 3-iodopropyl, 3 isocyanatopropyl, aminopropyl, methacryloyloxymethyl or cyanoethyl radicals. Preferred radicals $R^1$ contain 1 to 10 carbon atoms and also, optionally, halogen substituents. Particularly preferred radicals $R^1$ are methyl, phenyl, and the 3,3,3-trifluoropropyl radical, in particular the methyl radical.

The radicals $R^2$ are amenable to a hydrosilylation reaction. Examples thereof are alkenyl and alkynyl radicals such as the vinyl, allyl, isopropenyl, 3-butenyl, 2,4-pentadienyl, butadienyl, 5-hexenyl, undecenyl, ethynyl, propynyl, and hexynyl radicals; cycloalkenyl radicals such as the cyclopentenyl, cyclohexenyl, 3-cyclohexenylethyl, 5-bicycloheptenyl, norbornenyl, 4-cyclooctenyl and cyclooctadienyl radicals; alkenylaryl radicals such as the styryl and styrylethyl radicals, and also halogenated and heteroatom-containing derivatives of the above radicals, such as 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3 cyclohexenyloxy, acryloyl, acryloyloxy, methacryloyl and methacryloyloxy radicals. Preferred radicals $R^2$ are vinyl, allyl, and the 5-hexenyl radical, in particular the vinyl radical.

For the diorganopolysiloxanes (A) of the general formula (1) the viscosity as determined at 25° C. is preferably 100 mPa·s to 30,000 Pa·s. Particularly preferred is the viscosity range from 1 to 30,000 Pa·s. Depending on the nature of the addition-crosslinking composition, different viscosity ranges are particularly preferred. For the materials known as RTV-2 (room-temperature-vulcanizing silicone rubbers), viscosities of 100 to 10,000 mPa·s are particularly preferred; for LSR (liquid silicone rubbers), of 1 to 100 Pa·s; for HTV (high-temperature-vulcanizing silicone rubbers), from 2000 to 40 000 Pa·s.

Examples of $R^3$ are alkyl radicals such as the methyl, ethyl, propyl, isopropyl, tert-butyl, n-octyl, 2-ethylhexyl, and octadecyl radicals, and also cycloalkyl radicals such as the cyclopentyl, cyclohexyl, norbornyl or bornyl radicals. Preferred radicals $R^3$ are hydrocarbon radicals having 1 to 10 carbon atoms. A particularly preferred radical $R^3$ is the methyl radical.

Examples of $R^4$ are the phenyl, tolyl, xylyl, biphenylyl, anthryl, indenyl, phenanthryl, naphthyl, benzyl, phenylethyl and phenylpropyl radicals, and also derivatives of the above radicals that are halogenated and/or functionalized with organic groups, such as the o-, m-, and p-chlorophenyl, pentafluorophenyl, bromotolyl, trifluorotolyl, phenoxy, benzyloxy, benzyloxyethyl, benzoyl, benzoyloxy, p-tert-butylphenoxypropyl, 4-nitrophenyl, quinolyl and pentafluorobenzoyloxy radicals.

Examples of hydrocarbon radicals $R^4$ (b) having 2 to 20 carbon atoms are those such as 3-chloropropyl, 3-bromopropyl, 3,3,3-trifluoropropyl, 2-fluoroethyl, 1,1-dihydroperfluorododecyl and the 2-cyanoethyl radical. Preferred radicals $R^4$ are the phenyl radical and the 3,3,3-trifluoropropyl radical. A particularly preferred radical $R^4$ is the phenyl radical.

Preferred radicals $R^5$ are of the general formula (6)

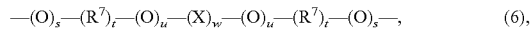

$$—(O)_s—(R^7)_t—(O)_u—(X)_w—(O)_u—(R^7)_t—(O)_s—, \quad (6),$$

where s, t, u, and w independently of one another denote the values 0, 1 or 2, $R^7$ at each occurrence can be identical or different and is a divalent, optionally halogen-substituted hydrocarbon radical which optionally contains O, N, S or P atoms, is free from aliphatically unsaturated groups, and contains 1 to 10 carbon atoms, such as —$CH_2$—, —$CH_2$—$CH_2$—, —$CH_2$—$CH_2$—$CH_2$—, —$CF_2$—, —$CH_2$—$CF_2$—, —$CH_2$—$CH(CH_3)$—, —$C(CH_3)_2$—, —$CH_2$—$C(CH_3)_2$—, —$C(CH_3)_2$—$CH_2$—, —$CH_2$—$CH_2$—O— or —$CF_2$—$CF_2$—O—, —(X)— is a divalent radical selected from -Ph-, -Ph-O-Ph-, -Ph-S-Ph-, -Ph-$SO_2$-Ph-, -Ph-$C(CH_3)_2$-Ph-, -Ph-$C(CF_3)_2$-Ph-, -Ph-C(O)-Ph-, cyclohexylene or norbornylene, -Ph- being a phenylene group. A particularly preferred radical $R^5$ is the phenylene radical.

The organohydropolysiloxane (B) contains per molecule at least two SiH groups, preferably at least 5. Another preferred embodiment contains 5 to 18 SiH groups per molecule. The viscosity of constituent (B) as measured at 25° C. is preferably 5 mPa·s to 1 Pa·s.

Owing to the instability of the SiH group, constituent (B) may as a result of its preparation include a small amount, typically <100 ppm by weight, of Si-bonded OH groups.

Examples of hydrocarbon radicals $R^6$ are alkyl radicals such as the methyl, ethyl, n-propyl, isopropyl, tert-butyl, n-pentyl, isopentyl, neopentyl, tert-pentyl, n-octyl, 2-ethylhexyl, 2,2,4-trimethylpentyl, and n-nonyl radicals; aryl radicals such as the phenyl, ethylphenyl, tolyl, xylyl, mesityl and naphthyl radicals; aralkyl radicals such as the benzyl, phenylethyl or phenylpropyl radicals, and also halogen-substituted or heteroatom-containing derivatives of the above radicals, such as the 3-chloropropyl, 3-bromopropyl, (p-chloromethyl) phenyl, (p-chloromethyl)phenethyl, hydroxymethyl, hydroxyethyl, hydroxypropyl, hydroxybutyl, 3,3,3-trifluoropropyl, acetyl, acetoxymethyl, acetoxyethyl, acetoxypropyl, 3-phenoxypropyl, benzoyloxypropyl radical. Preferred radicals $R^6$ are methyl, ethyl, propyl, butyl, octyl, phenyl, and 3,3,3-trifluoropropyl radicals. Particularly preferred radicals $R^6$ are methyl and phenyl radicals, of which the methyl group is the particularly preferred radical.

Organohydrooligosiloxane (C) preferably comprises compounds of the formulae (3) and (5) and more preferably compounds of the formula (3). For compounds of the formula (3), values of n of 4 to 6 are preferred, particular preference being given to 5 and 6, since in that way the mold stickiness is lower than when n is 4, and at the same time the adhesion is optimized. With n greater than 8, in turn, the adhesion is substantially impaired and it is no longer possible to observe the synergetic effect of (B) and (C) with respect to adhesion.

For 100 parts by weight of diorganopolysiloxane (A) use is preferably made of 0.1 to 30 parts by weight, preferably 0.5 to 10 parts by weight, and in particular 1 to 5 parts by weight of organohydropolysiloxane (B). Of the organohydrooligosiloxane (C) it is typical to use 0.02 to 9 parts by weight, preferably 0.1 to 3 parts by weight, and in particular 0.1 to 1.0 part by weight. Where the amount of organohydrooligosiloxane (C) is below 0.02 part by weight, the synergistic effect is not observed. The full effect is observed starting from a level of 0.1 part by weight. In the case of amounts above 9 parts by weight, the synergistic effect, which is dependent on the ratio of (B) to (C), becomes substantially weaker again. Moreover, it is then hardly possible any longer to obtain silicone elastomers having relatively high Shore A hardnesses (above 45). Furthermore, as the amount of organohydrooligosiloxane (C) goes up, there is an increase in the mold stickiness, which impacts adversely on the processing.

The ratio of the total amount of Si—H groups to the total amount of Si-vinyl groups may vary in ranges from 0.5 to 15, preference being given to 1.0 to 7 and particular preference to 1.2 to 4.5.

Hydrosilylation catalyst (D) serves as a catalyst for the addition reaction, referred to as hydrosilylation, between the aliphatically unsaturated hydrocarbon radicals $R^2$ of the diorganopolysiloxanes (A) and the silicon-bonded hydrogen atoms of the organohydropolysiloxanes (B) and of the organohydrooligosiloxanes (C). Numerous suitable hydrosilylation catalysts have been described in the literature. In principle it is possible to use all of the hydrosilylation catalysts corresponding to the prior art which are used in addition-crosslinking silicone rubber materials.

As the hydrosilylation catalyst (D) it is possible to use metals and their compounds, such as platinum, rhodium, palladium, ruthenium, and iridium, preferably platinum and rhodium. The metals may where appropriate have been fixed to finely divided support materials, such as activated carbon, metal oxides, such as aluminum oxide or silicon dioxide. Preference is given to using platinum and compounds of platinum. Particular preference is given to those platinum compounds which are soluble in polyorganosiloxanes. Soluble platinum compounds which can be used include, for example, the platinum-olefin complexes of the formulae $(PtCl_2.olefin)_2$ and $H(PtCl_3.olefin)$, preference being given to using alkenes having 2 to 8 carbon atoms, such as ethylene, propylene, isomers of butene and of octene, or cycloalkenes having 5 to 7 carbon atoms, such as cyclopentene, cyclohexene, and cycloheptene. Further soluble platinum catalysts are the platinum-cyclopropane complex of the formula $(PtCl_2C_3H_6)_2$, the reaction products of hexachloroplatinic acid with alcohols, ethers and aldehydes or mixtures thereof, or the reaction product of hexachloroplatinic acid with methylvinylcyclotetrasiloxane in the presence of sodium bicarbonate in ethanolic solution. Platinum catalysts with phosphorus ligands, sulfur ligands, and amine ligands can also be used, $(Ph_3P)_2PtCl_2$ for example. Particular preference is given to complexes of platinum with vinylsiloxanes, such as sym-divinyltetramethyldisiloxane.

The amount of hydrosilylation catalyst (D) used is guided by the desired crosslinking rate and also by economic aspects. Typically, per 100 parts by weight of diorganopolysiloxanes (A), use is made of $1\times10^{-5}$ to $5\times10^{-2}$ parts by weight, preferably $1\times10^{-4}$ to $1\times10^{-2}$, and in particular $5\times10^{-4}$ to $5\times10^{-3}$ parts by weight of platinum catalysts, calculated as platinum metal.

The self-adhesive, addition-crosslinking silicone compositions may where appropriate comprise further constituents (E) selected from the group containing inhibitors, stabilizers, catalysts, fillers, such as reinforcing and nonreinforcing fillers, plasticizers, adhesion promoters, soluble dyes, organic and inorganic pigments, solvents, fungicides, fragrances, dispersing assistants, Theological additives, corrosion inhibitors, oxidation inhibitors, light stabilizers, heat stabilizers, flame retardants, and agents for influencing the electrical properties.

In order to achieve sufficiently high mechanical strength on the part of the crosslinked silicone rubber it is preferred to incorporate actively reinforcing fillers as constituent (F) into the addition-crosslinking silicone compositions. Actively reinforcing fillers (F) used are, in particular, precipitated and fumed silicas, and also mixtures thereof. The specific surface area of these actively reinforcing fillers should be at least 50 $m^2/g$, and preferably in the range from 150 to 400 $m^2/g$ as determined by the BET method. Actively reinforcing fillers of this kind are very well-known materials in the silicone rubber field.

The compounding of the self-adhesive addition-crosslinking silicone compositions is accomplished by mixing the above-recited components in any order.

The crosslinking of the self-adhesive addition-crosslinking silicone compositions to form silicone elastomers and composite materials is accomplished preferably by heating, preferably at 40 to 250° C., more preferably at at least 50° C., in particular at at least 80° C., and preferably at not more than 200° C., in particular at not more than 180° C.

The invention also provides the addition-crosslinked silicone elastomers and composite materials.

In the process for producing composite materials, the silicone composition is applied to the substrate and subsequently crosslinked, preferably by heating at 40 to 250° C., to form a composite material.

The self-adhesive addition-crosslinking silicone compositions can be used in particular with advantage wherever there is a desire for effective adhesion between the addition-crosslinked silicone elastomer and a substrate consisting preferably of organic polymers, metals or glasses. The substrate may take the form of a molding, film or coating. The self-adhesive addition-crosslinking silicone compositions are suitable for producing composite material by coating, adhesive bonding or encapsulation and for producing shaped articles. The self-adhesive addition-crosslinking silicone compositions are especially suitable for the encapsulation and adhesive bonding of electrical and electronic parts and also for the production of composite moldings. By composite moldings are meant, here, a unitary shaped article comprising a composite material which is composed of a silicone elastomer part, produced from the silicone compositions, and at least one substrate, in such a way that there is a solid, permanent bond between the two parts. A composite molding of this kind is preferably produced by processing organic polymer to form a shaped article and then joining the silicone compositions to said molding and carrying out crosslinking, which can be done, for example, in an injection molding process, by means of extrusion, or in a process known as press molding.

Composite materials and, in particular, composite moldings can be employed in any of a very wide variety of application fields, such as, for example, in the electronics, household appliance, consumer goods, construction, and automobile industries, in medical engineering, and in the manufacture of sports and leisure articles.

EXAMPLES

In the examples below, unless indicated otherwise in any given case, all pressures are 0.10 MPa (absolute), and all temperatures are 23° C.

Substrates

The adhesion of the inventive and also noninventive addition-crosslinked silicone elastomers was tested on the following substrates:
a) PBT (Polybutylene terephthalate): Ultradur® B4300G6 from BASF AG, Ludwigshafen, Germany; 30% glass fiber reinforced (GF)
b) PBT: Pocan® B3235 from Bayer AG, Leverkusen, Germany; 30% (GF)
c) polyamide 6: Durethan® BKV 30 from Bayer AG, Leverkusen, Germany; 30% (GF)
d) aluminum (industrial grade; not primed)
e) steel: VA steel (industrial grade)

Characterization of Adhesion

A substrate strip of dimensions 60×25×2 mm is inserted into a stainless steel compression mold and the mold is filled with the addition-crosslinking silicone elastomer material to be tested. To prevent excessive extension of the silicone elastomer in the tensile tests, a band of textile is incorporated into the silicone elastomer by crosslinking. Press vulcanization takes place at a temperature of 170° C. and a pressure of 30 tons for 3 minutes. Following removal of the laminate and its storage at room temperature for at least 16 hours, the rigid substrate body is clamped in firmly and a measurement is made of the maximum parting force needed to detach the adhering silicone elastomer strip in a peel test. The parting force (PF) is determined along the lines of DIN ISO 813 and is reported in N/mm. For each example, 4 laminates are measured, the parting force is determined as the average value, and the proportion of cohesive failure is determined as a percentage. Cohesive failure (CF) of 0% means that the silicone elastomer underwent complete detachment, without residue, from the substrate surface. Cohesive failure of 100% means that the delamination occurred exclusively by crack propagation within the silicone elastomer.

Example 1

Inventive

Base Compound 1 (BC):
A laboratory compounder was charged with 156 g of a vinyldimethylsiloxy-terminated polydimethylsiloxane having a viscosity of 20,000 mPa·s (25° C.) and this initial charge was heated to 150° C. and admixed with 116 g of a hydrophobic fumed silica having a specific surface area of 300 $m^2/g$ and a carbon content of 4.2% by weight. This highly viscous compound was subsequently diluted with 141 g of the above-mentioned polydimethylsiloxane. Kneading under reduced pressure (10 mbar) at 150° C. removed volatiles within the course of one hour.

Preparation of the A Component:

100 g of base compound 1 are mixed with 1.0 g of a dimethylvinylsiloxy-endcapped polydimethylsiloxane with methylvinylsiloxy groups, having a vinyl content of 2.5 mmol/g and a viscosity of 350 mm$^2$/s, and 0.2 g of a catalyst solution having a Pt content of 1% by weight, containing a platinum-divinyltetramethyldisiloxane complex in silicone polymer.

Preparation of the B Component:

79.5 g of base compound 1 are mixed with 0.1 g of 1-ethynyl-1-cyclohexanol, 15 g of a vinyldimethylsiloxy-terminated polydimethylsiloxane having a viscosity of 20,000 mPa·s (25° C.), 4.8 g of a copolymer made up of dimethylsiloxy, methylhydrosiloxy, phenylsiloxy, and trimethylsiloxy units and having a viscosity of 65 mm$^2$/s and an Si—H content of 0.9%, and 0.5 g of tetramethylcyclotetrasiloxane.

Comparative Example C2

Noninventive

The preparation of BC1, component A and B takes place in the same way as in example 1 except that in component B, 0.5 g of 3-glycidyloxypropyltrimethoxysilane was used instead of 0.5 g of tetramethylcyclotetrasiloxane.

Comparative Example C3

Noninventive

The preparation of BC1, component A and B takes place in the same way as in example 1 except that in component B, 0.5 g of a copolymer made up of methylhydrosiloxy and trimethylsiloxy units and having an average of 30 methyl SiH—O groups and an average Si—H content of 15 mmol/g (corresponding to an Si—H content of approximately 1.5% by weight) was used instead of 0.5 g of tetramethylcyclotetrasiloxane.

Comparative Example C4

Noninventive

The preparation of BC1, component A and B takes place in the same way as in example 1 except that in component B a total of 5.8 g of the copolymer specified in example 1 were used instead of 0.5 g of tetramethylcyclotetrasiloxane.

Example 5

Inventive

The preparation of BC1, component A and B takes place in the same way as in example 1 except that in component B a total of 1.0 g of tetramethylcyclotetrasiloxane was used, rather than 0.5 g of tetramethylcyclotetrasiloxane.

Example 6

Inventive

The preparation of BC1, component A and B takes place in the same way as in example 1 except that in component B, instead of 0.5 g of tetramethylcyclotetrasiloxane, 1.0 g of a trimethylsiloxy-endcapped Si—H-siloxane containing on average 5 Si—H groups was used.

Example 7

Inventive

The preparation of BC1, component A and B takes place in the same way as in example 1 except that in component B, instead of 4.8 g of the copolymer made up of dimethylsiloxy, methylhydrosiloxy, phenylsiloxy, and trimethylsiloxy end groups, 5.2 g of a copolymer made up of dimethylsiloxy, methylhydrosiloxy, methylphenylsiloxy, and trimethylsiloxy end groups, having a viscosity of 34 mm$^2$/s and an Si—H content of 0.79% by weight, were used.

Example 8

Inventive

The preparation of GM 1, component A and B takes place in the same way as in example 1 except that in component B, instead of 4.8 g of copolymer, 5.2 g of another copolymer made up of methylhydrosiloxy, diphenylsiloxy, and trimethylsiloxy end groups and having a viscosity of 69 mm$^2$/s and an Si—H content of 0.8% by weight were used.

Example 9

Inventive

The preparation of GM 1, component A and B takes place in the same way as in example 1 except that in component B, instead of 4.8 g of copolymer, 5.0 g of a copolymer made up of methylhydrosiloxy, —OSi(Me)$_2$-C$_6$H$_4$—Si(Me)$_2$O— and trimethylsiloxy end groups and having a viscosity of 73 mm$^2$/s and an Si—H content of 0.82% by weight were used.

Example 10

Inventive

The preparation of BC 1, component A and B takes place in the same way as in example 1 except that in component B, instead of 0.5 g of tetramethylcyclotetrasiloxane, 0.5 g of a hydrodimethylsiloxy-endcapped Si—H-siloxane containing on average 6 Si—H groups and having an Si—H content of 1.6% by weight was used.

For the adhesion tests, components A and B were mixed in a 1:1 ratio in each case and were crosslinked on the respective substrate as described above. The results of examples (ex.) 1 to 10 for the parting force (PF) measurements in [N/mm], and the cohesive failure (CF) in [%], on the various substrates (sub.) a) to e) are reported in tables 1 and 2.

TABLE 1

| | Sub. | | | | | | | | | | |
|---|---|---|---|---|---|---|---|---|---|---|---|
| | a) | | b) | | c) | | d) | | e) | | Total |
| Ex. | PF | CF | PF | CF | PF | CF | PF | CF | PF | CF | PF |
| 1 | 12.5 | 100 | 9.9 | 100 | 6.7 | 80 | 3.5 | 40 | 3.3 | 40 | 35.9 |
| C2 | 3.4 | 20 | 1.9 | 0 | 5.0 | 60 | 7.0 | 80 | 3.9 | 40 | 21.2 |
| C3 | 1.5 | 0 | 0.9 | 0 | 0 | 0 | 0 | 0 | 0 | 0 | 2.4 |
| C4 | 2.3 | 0 | 0.6 | 0 | 0 | 0 | 0 | 0 | 0 | 0 | 2.9 |

TABLE 2

| | Sub. | | | | | | | | | |
|---|---|---|---|---|---|---|---|---|---|---|
| | a) | | b) | | c) | | d) | | e) | Total |
| Ex. | PF | CF | PF | CF | PF | CF | PF | CF | PF | CF | PF |
| 5 | 11.6 | 100 | 11.1 | 100 | — | — | 6.2 | 40 | — | — | 28.9 |
| 6 | 7.2 | 80 | 5.4 | 50 | 4.2 | 60 | 6.0 | 70 | 3.8 | 40 | 26.6 |
| 7 | 9.8 | 100 | 11.2 | 100 | — | — | 3.4 | 40 | 3.2 | 40 | 27.6 |
| 8 | 10.0 | 100 | 10.5 | 100 | — | — | 3.9 | 40 | 3.2 | 40 | 27.6 |
| 9 | 12.9 | 100 | 10.4 | 100 | 6.1 | 70 | 4.9 | 40 | 4.4 | 40 | 38.7 |
| 10 | 6.0 | 70 | 3.9 | 50 | — | — | 3.1 | 40 | 2.4 | 30 | 15.4 |

— not determined

The values reported in tables 1 and 2 are evidence of the high adhesion of laminates consisting of the inventive addition-crosslinked silicone elastomer (example 1) and organic polymers or metals, in the case of press vulcanization. Using the silicone rubber blends of the invention, high adhesion values without failure phenomena were achievable on all of the substrates investigated. In the sum total of the individual adhesions (PF) in [N/mm] as well, the silicone rubber blend of the invention performs the best by a considerable margin.

As is apparent from example 2, the sole presence of constituent (B) in combination with an adhesion promoter (e.g., glycidyloxypropyltrimethoxysilane) does give adhesion values which, overall, are good. However, these values are substantially lower than those of the silicone rubber blend of the invention. Moreover, the adhesion to Pocan b) is extremely moderate. The combination of constituent (B) with a very Si—H-rich, long-chain crosslinker, as is apparent from example 3, leads only to extremely moderate adhesion values. As can be seen from example 4, the sole presence of constituent (B) also does not lead to a high adhesive strength, which is achieved, instead, only in conjunction with an inventive constituent (C). This is a demonstration of synergy between the adhesion-promoting constituents (B) and (C) of the silicone rubber materials of the invention.

In order to investigate the stability of the adhered assembly, 4 assembly specimens were stored at RT and 80% humidity for four weeks and then subjected to the adhesion investigations as described above. The results can be seen in table 3.

TABLE 3

| | Sub. | | | | | | |
|---|---|---|---|---|---|---|---|
| | a) | | b) | | c) | | Total |
| Ex. | PF | CF | PF | CF | PF | CF | PF |
| 1 | 11.9 | 100 | 9.7 | 100 | 7.1 | 80 | 28.7 |
| C2 | 1.2 | 0 | 1.3 | 0 | 5.2 | 60 | 7.7 |
| C3 | 0 | 0 | 0 | 0 | 0 | 0 | 0 |
| C4 | 0.8 | 0 | 1.5 | 0 | 0 | 0 | 2.3 |

As is apparent from example 1, there is virtually no change in the adhesion values after storage of the assembly. In contrast, in the case of the noninventive materials, the adhesion on some substrates falls sharply.

The influence of the stability of the respective A and B components was investigated by storing the compositions at RT for four weeks after production, and only then producing adhered assemblies in accordance with processes described above, and investigating these assemblies for their adhesion. These results can be seen in table 4.

TABLE 4

| | Sub. | | | | | | | | | |
|---|---|---|---|---|---|---|---|---|---|---|
| | a) | | b) | | c) | | d) | | e) | Total |
| Ex. | PF | CF | PF | CF | PF | CF | PF | CF | PF | CF | PF |
| 1 | 9.4 | 100 | 9.0 | 100 | 6.3 | 60 | 3.4 | 40 | 3.5 | 40 | 31.6 |
| C2 | 1.9 | 0 | 1.4 | 0 | 4.6 | 50 | 7.2 | 60 | 3.5 | 40 | 18.6 |
| C3 | 1.9 | 0 | 1.5 | 0 | 0 | 0 | 0 | 0 | 0 | 0 | 3.4 |
| C4 | 1.3 | 0 | 0 | 0 | 0 | 0 | 0 | 0 | 0 | 0 | 1.3 |

As is apparent from example 1, there is virtually no change in the adhesion values even after storage of the uncrosslinked A and B components. In the case of the noninventive materials, in contrast, there is a sharp fall in adhesion on certain substrates.

Table 5 shows the viscosity in [Pa·s] of the B components of examples 1 to 4, measured using a rheometer at a shear rate of D=0.98. Measurements were made of the viscosity both immediately after the mixture had been prepared and also after the components had been stored at room temperature for two weeks.

TABLE 5

| Ex. | Viscosity immediate | Viscosity after 2 weeks | Viscosity increase in [%] |
|---|---|---|---|
| 1 | 911 | 980 | 7.5 |
| C2 | 1090 | 1208 | 10.8 |
| C3 | 927 | 1060 | 14.3 |
| C4 | 991 | 1160 | 17.1 |

As is apparent from table 5, the inventive silicone rubber mixture from example 1 has the lowest viscosity and the lowest increase in viscosity after storage.

Table 6 reproduces the mechanical properties of examples 1 to 4.

TABLE 6

| Ex. | Shore A | Breaking extension [%] | Tensile strength [N/mm$^2$] | Tear propagation resistance [N/mm] |
|---|---|---|---|---|
| 1 | 39 | 690 | 9.5 | 24 |
| C2 | 43 | 601 | 8.7 | 20.4 |
| C3 | 43 | 618 | 10 | 21 |
| C4 | 43 | 630 | 9.3 | 17.3 |

As is apparent from table 6, the mechanical properties of the inventive silicone rubber mixture are very good and balanced. In particular the material combines a high elongation at break and high tensile strength with high tear propagation resistance.

What is claimed is:

1. A self-adhesive addition-crosslinking silicone composition comprising
   (A) 100 parts by weight of at least one diorganopolysiloxane of the formula (1)

$$R^1_a R^2_b SiO_{(4-a-b)/2} \quad (1)$$

in which
   $R^1$ is hydroxyl radical or a monovalent, optionally halogen-substituted $C_{1-20}$ hydrocarbon radical optionally containing O, N, S or P atoms, and being free from aliphatically unsaturated groups, $R^2$ is a monovalent, aliphatically unsaturated, optionally halogen-substituted $C_{2-10}$ hydrocarbon radical optionally containing O, N, S or P atoms, b is from 0.0003 to 2, with the provisos that $1.5<(a+b)\leq 3.0$, that per molecule there are on average at least two aliphatically unsaturated radicals $R^2$, and that the viscosity of the diorganopolysiloxanes (A) as determined at 25° C. is 1 mPa·s to 40,000 Pa·s, (B) 1-5 parts by weight of at least one organohydropolysiloxane of the formula (2)

$$R^3_c R^4_d R^5_e H_f SiO_{(4-c-d-2e-f)/2} \quad (2)$$

where $R^3$ is a monovalent aliphatically saturated $C_{1-10}$ hydrocarbon radical, $R^4$ (a) is an optionally halogen-substituted monovalent $C_{6-20}$ hydrocarbon radical which contains at least one aromatic $C_6$ ring, and/or (b) is a halogen-substituted, saturated monovalent $C_{2-20}$ hydrocarbon radical optionally containing O or N atoms, $R^5$ is an optionally halogen-substituted $C_{6-24}$ hydrocarbon radical optionally containing O, N, S or P atoms which is divalent and is Si-bonded at both ends, c and f are positive numbers, and d and e are zero or a positive number, with the provisos that d and e cannot simultaneously be zero, that the viscosity of the organohydropolysiloxane (B) as determined at 25° C. is 5 mPa·s to 5 Pa·s, and the organohydrogensiloxane (B) contains per molecule 5 to 18 SiH groups and less than 12 mol percent phenyl groups, (C) 0.1 to 3 parts by weight of at least one organohydrooligosiloxane of the formula (3), $$(R^6 HSiO)_n \quad (3),$$

where $R^6$ is a monovalent, optionally halogen-substituted $C_{1-10}$ hydrocarbon radical, and n is 4, 5, 6, 7, or 8, (D) $1\times 10^{-5}$ to $1\times 10^{-2}$ parts by weight of at least one hydrosilylation catalyst.

2. The silicone composition of claim 1, further comprising additional constituent(s) (E) selected from the group consisting of inhibitors, stabilizers, catalysts, fillers, plasticizers, adhesion promoters, soluble dyes, organic and inorganic pigments, solvents, fungicides, fragrances, dispersing assistants, rheological additives, corrosion inhibitors, oxidation inhibitors, light stabilizers, heat stabilizers, flame retardants, and agents for influencing electrical properties.

3. A process for producing an addition-crosslinked silicone elastomer or composite material, which comprises heating the silicone composition of claim 1 at 40 to 250° C.

4. A process for producing an addition-crosslinked silicone elastomer or composite material, which comprises heating the silicone composition of claim 2 at 40 to 250° C.

5. An addition-crosslinked silicone elastomer or composite material obtained by the process of claim 3.

6. A composite material comprising a substrate, and adhered thereto, a silicone elastomer prepared by curing the silicone composition of claim 1.

7. In a process for the preparation of a composite material or shaped article wherein an addition-crosslinking silicone composition is employed, the improvement comprising selecting as an addition-crosslinking silicone composition the self-adhesive addition crosslinking silicone composition of claim 1.

8. In a process for encapsulating or adhesively bonding of electrical and electronic parts wherein an addition-crosslinking silicone composition is employed, the improvement comprising selecting as an addition-crosslinking silicone composition the self-adhesive addition crosslinking silicone composition of claim 1.

* * * * *